United States Patent
Kodihalli et al.

(10) Patent No.: US 10,375,038 B2
(45) Date of Patent: Aug. 6, 2019

(54) SYMMETRIC MULTIPROCESSING MANAGEMENT

(71) Applicant: International Business Machines Corporation, Armonk, NY (US)

(72) Inventors: Deepak Kodihalli, Bangalore (IN); Venkatesh Sainath, Bangalore (IN); Dhruvaraj Subhashchandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/364,297

(22) Filed: Nov. 30, 2016

(65) Prior Publication Data

US 2018/0152422 A1     May 31, 2018

(51) Int. Cl.
  *H04L 29/06*   (2006.01)
  *G06F 11/16*   (2006.01)
  *G06F 11/30*   (2006.01)
  *G06F 11/00*   (2006.01)

(52) U.S. Cl.
  CPC .......... *H04L 63/0435* (2013.01); *G06F 11/00* (2013.01); *G06F 11/16* (2013.01); *G06F 11/3006* (2013.01); *G06F 11/3024* (2013.01); *G06F 11/3048* (2013.01); *G06F 11/3051* (2013.01); *H04L 63/061* (2013.01)

(58) Field of Classification Search
  CPC .... H04L 63/0435; H04L 63/061; G06F 11/00; G06F 11/3051; G06F 11/3024; G06F 11/3006; G06F 11/16; G06F 9/4405; G06F 11/3048
  See application file for complete search history.

(56) References Cited

U.S. PATENT DOCUMENTS

| | | | | |
|---|---|---|---|---|
| 5,021,945 A | * | 6/1991 | Morrison | G06F 8/445 712/216 |
| 5,574,849 A | * | 11/1996 | Sonnier | G01R 31/31727 711/E12.026 |
| 7,398,380 B1 | | 7/2008 | Lovett et al. | |
| 8,488,472 B2 | | 7/2013 | Morris et al. | |
| 8,793,480 B2 | * | 7/2014 | Aldereguia | G06F 8/65 713/1 |
| 2006/0181942 A1 | | 8/2006 | Cordero et al. | |
| 2006/0184706 A1 | * | 8/2006 | Fields, Jr. | G06F 13/1652 710/305 |
| 2006/0212762 A1 | | 9/2006 | Zimmer et al. | |

(Continued)

*Primary Examiner* — Matthew Smithers
(74) *Attorney, Agent, or Firm* — Jared C. Chaney

(57) ABSTRACT

Disclosed aspects relate to symmetric multiprocessing (SMP) management. A first SMP topology may be identified by a service processor firmware. The first SMP topology may indicate a first set of connection paths for a plurality of processor chips of a multi-node server. A second SMP topology may be identified by the service processor firmware. The second SMP topology may indicate a second set of connection paths for the plurality of processor chips of the multi-node server. The second SMP topology may differ from the first SMP topology. An error event related to the first SMP topology may be detected. A set of traffic may be routed using the second SMP topology. The set of traffic may be routed by the service processor firmware in response to detecting the error event related to the first SMP topology.

19 Claims, 9 Drawing Sheets

(56) References Cited

U.S. PATENT DOCUMENTS

| | | | |
|---|---|---|---|
| 2007/0168762 A1* | 7/2007 | Bartley | G06F 11/1064 714/52 |
| 2008/0008202 A1* | 1/2008 | Terrell | H04L 45/00 370/401 |
| 2008/0080384 A1* | 4/2008 | Atkins | H04L 41/0631 370/252 |
| 2008/0184214 A1* | 7/2008 | Archer | G06F 11/3404 717/155 |
| 2009/0198958 A1* | 8/2009 | Arimilli | H04L 45/06 712/29 |
| 2009/0307439 A1* | 12/2009 | Jacobs | G06F 11/0712 711/153 |
| 2014/0149731 A1* | 5/2014 | Reick | G06F 9/4436 713/2 |
| 2015/0019901 A1* | 1/2015 | Griffith | G06F 11/2048 714/4.11 |
| 2015/0026432 A1 | 1/2015 | Borkenhagen et al. | |
| 2015/0186215 A1 | 7/2015 | Das Sharma et al. | |
| 2015/0244647 A1 | 8/2015 | Gopalan et al. | |
| 2017/0099159 A1* | 4/2017 | Abraham | H04L 12/4641 |

\* cited by examiner

800

810

|  | N0P0 | N1P0 | N2P0 |
|---|---|---|---|
| N0P0 | X | 00 | 01 |
| N1P0 | 00 | X | 01 |
| N2P0 | 00 | 01 | X |

860

|  | N0P0 | N1P0 | N2P0 |
|---|---|---|---|
| N0P0 | X | 01 (instead of 00) | 01 |
| N1P0 | 00 | X | 01 |
| N2P0 | 00 | 01 | X |

| Start Address | End Address | Bus ID | Role | Status |
|---|---|---|---|---|
| 0x1400 | 0x15FF | X0 | Primary | Functional |
| 0x1600 | 0x18FF | X1 | Primary | Functional |
| 0x1900 | 0x1FFF | X2 | Primary | Functional |
| 0x2000 | 0x2FFF | A0 | Primary | Functional |
| 0x3000 | 0x3FFF | A1 | Primary | Functional |
| 0x4000 | 0x4FFF | A2 | Primary | Functional |

940

| Start Address | End Address | Bus ID | Role | Status |
|---|---|---|---|---|
| 0x2400 | 0x25FF | X0 | Primary | Functional |
| 0x2600 | 0x28FF | X1 | Primary | Functional |
| 0x2900 | 0x2FFF | X2 | Primary | Functional |
| 0x1000 | 0x1FFF | A0 | Primary | Functional |
| 0x3000 | 0x3FFF | A1 | Primary | Functional |
| 0x4000 | 0x4FFF | A2 | Primary | Functional |

970

| Start Address | End Address | Bus ID | Role | Status |
|---|---|---|---|---|
| 0x1400 | 0x15FF | X0 | Primary | Functional |
| 0x1600 | 0x18FF | X1 | Primary | Functional |
| 0x1900 | 0x1FFF | X2 | Primary | Functional |
| 0x2000 | 0x2FFF | A0 | Primary | Not - Functional |
| 0x3000 | 0x3FFF | A1 | Primary | Functional |
| 0x4000 | 0x4FFF | A2 | Primary | Functional |
| 0x2000 | 0x23FF | A1 | Backup | Functional |
| 0x2400 | 0x25FF | X0 | Backup | Functional |
| 0x2600 | 0x28FF | X1 | Backup | Functional |
| 0x2900 | 0x29FF | X2 | Backup | Functional |

SYMMETRIC MULTIPROCESSING MANAGEMENT

BACKGROUND

This disclosure relates generally to computer systems and, more particularly, relates to symmetric multiprocessing (SMP) management. SMP management may be desired to be performed as efficiently as possible. The number of hardware components in server systems that need to be managed by enterprises is increasing. As the number of hardware components in servers systems continues to increase, the need for efficient SMP management for those hardware components may increase.

SUMMARY

Aspects of the disclosure relate to symmetric multiprocessing (SMP) management with respect to a multi-node server by service processor firmware of a hardware service processor. In the event that a connection path between two or more processors becomes unavailable, bus traffic may be rerouted via an alternate network path to facilitate component communication. The SMP topology of a set of nodes may be evaluated, and connection path information may be written in processor registers for bus-based routing. Based on the SMP topology, a set of alternate paths for the bus network may be generated. The set of alternate paths may be written to a separate set of registers, such that the multi-node server can switch to the set of alternate paths dynamically if errors are detected with respect to particular connection paths of the active SMP topology. A hypervisor configured to manage the multi-node server may instruct one or more service processors to dynamically compute one or more alternate paths in the event a specific data request routing fails.

Disclosed aspects relate to symmetric multiprocessing (SMP) management. A first SMP topology may be identified by a service processor firmware. The first SMP topology may indicate a first set of connection paths for a plurality of processor chips of a multi-node server. A second SMP topology may be identified by the service processor firmware. The second SMP topology may indicate a second set of connection paths for the plurality of processor chips of the multi-node server. The second SMP topology may differ from the first SMP topology. An error event related to the first SMP topology may be detected. A set of traffic may be routed using the second SMP topology. The set of traffic may be routed by the service processor firmware in response to detecting the error event related to the first SMP topology.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 illustrates an example system for symmetric multiprocessing management, according to embodiments.

FIG. 9 illustrates an example system for symmetric multiprocessing management, according to embodiments.

Figure 1:
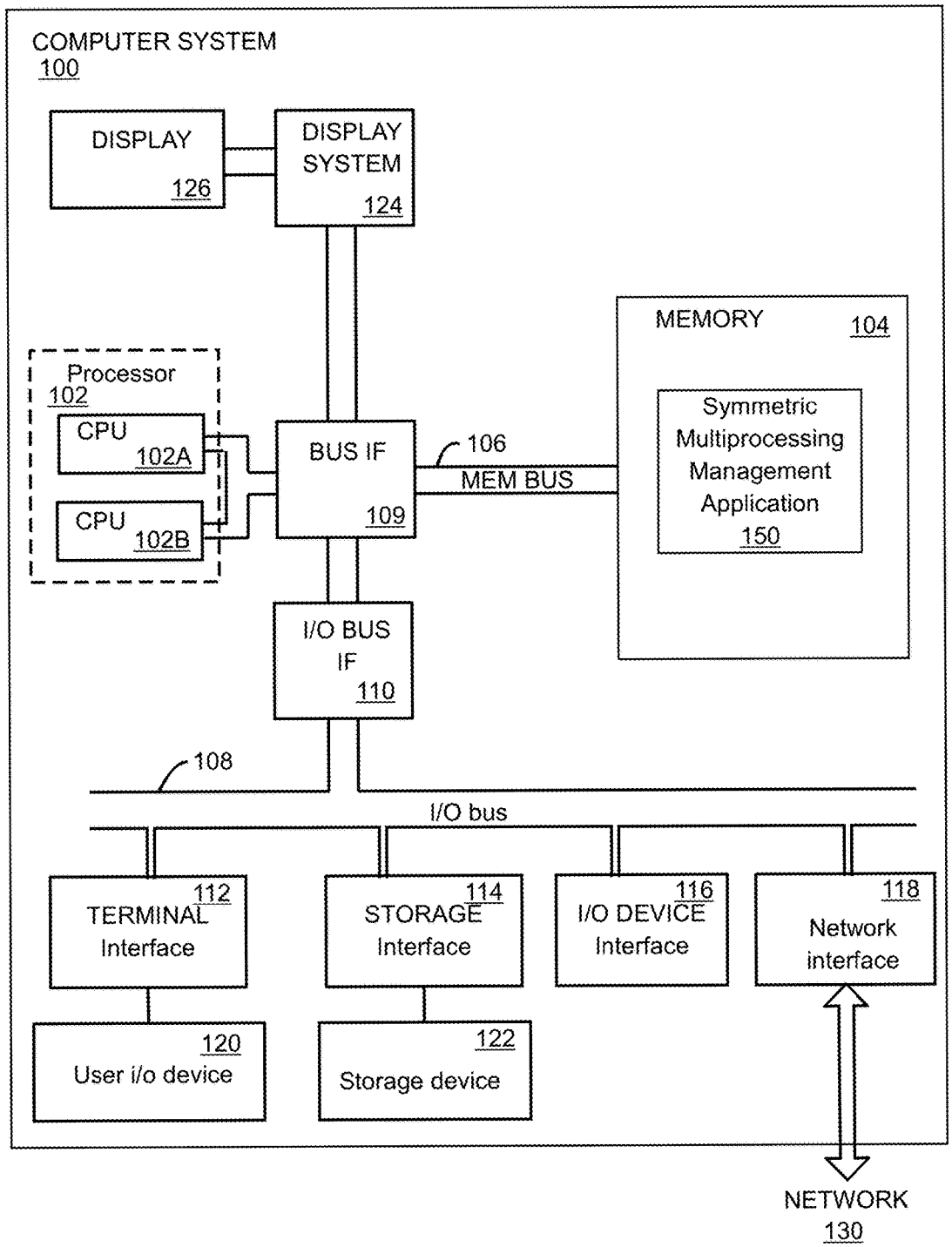
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to symmetric multiprocessing (SMP) management with respect to a multi-node server by service processor firmware of a hardware service processor. In the event that a connection path between two or more processors becomes unavailable (e.g., as the result of an error), bus traffic may be rerouted via an alternate network path to facilitate component communication. The SMP topology of a set of nodes may be evaluated, and connection path information may be written in processor registers for bus-based routing. Based on the SMP topology, a set of alternate paths for the bus network may be generated (e.g., by a service processor of a system node). The set of alternate paths may be written to a separate set of registers, such that the multi-node server can switch to the set of alternate paths dynamically (e.g., on-the-fly) if errors are detected with respect to particular connection paths of the active SMP topology. A hypervisor configured to manage the multi-node server may instruct one or more service processors to dynamically compute one or more alternate paths in the event a specific data request routing fails. Leveraging a set of alternate connection paths for a multi-node server may be associated with benefits including high availability, data communication reliability, and application performance.

In multi-node servers, processor chips may engage in data communication with other processor chips within the multi-node server environment. Logical addresses may be used to distinguish between processor chips on the same node and processor chips located on separate nodes in the same server. Based on the logical addresses, data requests may be routed over inter-node SMP buses when the address range corresponds to another node, and data requests may be routed over intra-node SMP buses when the address range corresponds to the same node. Aspects of the disclosure relate to the recognition that, in some situations, particular connection paths may be associated with errors (e.g., cable failures) or processor chips may be unavailable (e.g., taken down for maintenance), which may impact the flow of data traffic between processor chips. Accordingly, aspects of the disclosure relate to formulating a back-up SMP topology to indicate a set of alternate connection paths that may be used to facilitate data communication between processor chips of the multi-node server environment in the event of an error. In this way, application programs hosted by the multi-node server may be maintained with high availability, and data communication between processor chips may be reliability performed.

Aspects of the disclosure include a system, method, and computer program product for symmetric multiprocessing (SMP) management. The SMP management may be with respect to a multi-node server by service processor firmware of a hardware service processor. A first SMP topology may be identified by the service processor firmware. The first SMP topology may indicate a first set of connection paths for the plurality of processor chips of the multi-node server. A second SMP topology may be identified by the service processor firmware. The second SMP topology may indicate a second set of connection paths for the plurality of processor chips of the multi-node server. The second SMP topology may differ from the first SMP topology. An error event related to the first SMP topology may be detected. A set of traffic may be routed using the second SMP topology. The set of traffic may be routed by the service processor firmware in response to detecting the error event related to the first SMP topology.

In embodiments, one or more SMP topologies may be built by writing connection path information in a set of registers which has a bus-based routing configuration. In embodiments, the second SMP topology which indicates the second set of connection paths for the plurality of processor chips of the multi-node server may be computed by the service processor firmware based on a plurality of address ranges which map to the plurality of processor chips of the multi-node server. In embodiments, the second SMP topology may be computed by the service processor firmware using a processor chip connector list and a set of registers. In embodiments, the second SMP topology may be computed in a dynamic fashion by the service processor firmware in response to detecting the error event related to the first SMP topology. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a symmetric multiprocessing management application 150. In embodiments, the symmetric multiprocessing management application 150 may include instructions or statements that execute on the processor 102 or instructions or statements that are interpreted by instructions or statements that execute on the processor 102 to carry out the functions as further described below. In certain embodiments, the symmetric multiprocessing management application 150 is implemented in hardware via semiconductor devices, chips, logical gates, circuits, circuit cards, and/or other physical hardware devices in lieu of, or in addition to, a processor-based system. In embodiments, the symmetric multiprocessing management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
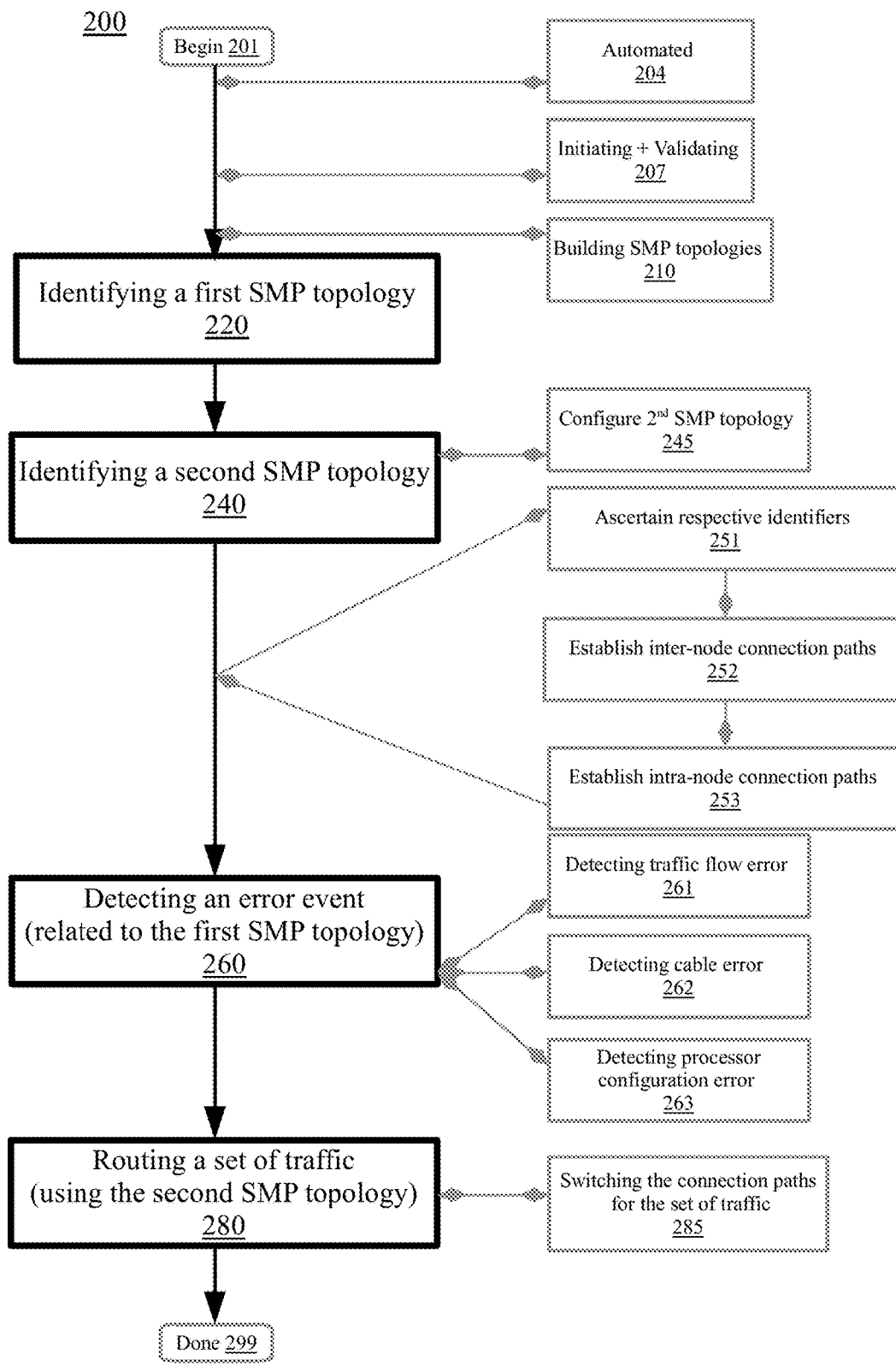
FIG. 2 is a flowchart illustrating a method for symmetric multiprocessing management, according to embodiments.

FIG. 2 is a flowchart illustrating a method 200 for symmetric multiprocessing management, according to embodiments. Aspects of method 200 relate to identifying SMP topology information including a first SMP topology and a second (e.g., alternate) SMP topology, and using the second SMP topology to route a set of data traffic in response to detecting an error event related to the first SMP topology. As described herein, in certain embodiments, aspects of the method 200 may be performed with respect to a multi-node server. The multi-node server may include a computing device configured to provide functionality for other programs or devices (e.g., clients). For example, the multi-node server may be configured to provide various services such as data/resource sharing functionality, computation operations, data storage/streaming functionality, or the like to one or more clients. In embodiments, the multi-node server may include a set of nodes. The set of nodes may include a set, group, cluster, or other physical or logical collection of a plurality of processor chips. The plurality of processor chips may include integrated circuits or other electronic circuitry elements configured to carry out the instructions of computer programs (e.g., applications hosted by the multi-node server). As described herein, the plurality of processor chips may be communicatively connected to other processor chips of the multi-node server. For instance, processor chips may be communicatively connected to other processor chips located on the same node (e.g., intra-node node connections) as well as processor chips located on other nodes (e.g., inter-node connections) of the multi-node server. In certain embodiments, aspects of the disclosure may be implemented with respect to a single-node server (e.g., upon detection of an error detected with respect to a intra-node interface, processor chips may fall-back to a second SMP topology). As described herein, aspects of the disclosure relate to leveraging a set of alternate connection paths between a plurality of processor chips to facilitate high availability, data communication reliability, and application performance. The method 200 may begin at block 201.

In embodiments, the identifying, the identifying, the detecting, the routing, and other steps described herein may each occur in an automated fashion at block 204. In embodiments, the identifying of the first SMP topology, the identifying of the second SMP topology, the detecting of the error event, the routing of the set of traffic, and other steps described herein may be carried out by an internal SMP management module maintained in a persistent storage device of the multi-node server or a locally connected hardware device. In certain embodiments, the identifying, the identifying, the detecting, the routing, and other steps described herein may be carried out by an external SMP management module hosted by a remote computing device or server (e.g., accessible via a subscription, usage-based system, or other service model). In this way, aspects of SMP management may be performed using automated computing machinery without manual action. Other methods of performing the steps described herein are also possible.

In embodiments, initiating and validating may occur at block 207. An initial program load may be initiated. Generally, initiating can include beginning, launching, executing, performing, instantiating, or otherwise starting the initial program load. In embodiments, initiating the initial program load may include performing a boot operation to activate, initialize, or otherwise configure the multi-node server. In certain embodiments, initiating the initial program load may include programming a set of processor chips included in the multi-node server by loading a set of application instructions (e.g., directions or commands for executing an application program hosted by the multi-node server). A potential for one or more SMP topologies may be validated by the service processor firmware. Generally, validating can include verifying, confirming, evaluating, assessing, or otherwise ascertaining the potential for one or more SMP topologies. In embodiments, validating can include analyzing (e.g., examining) the physical and logical arrangement of the plurality of processor chips hosted by the multi-node server, and ascertaining whether or not multiple (e.g., alternate) SMP topologies can be constructed for the multi-node server. As an example, for a multi-node server that includes 3 separate nodes where each node hosts 4 processor chips, the configuration may be validated as supporting multiple potential SMP topologies (e.g., such a configuration allows for a number of possible logical topology arrangements). Other methods of initiating an initial program load and validating a potential for one or more SMP topologies are also possible.

In embodiments, one or more SMP topologies may be built at block 210. The building of one or more SMP topologies may occur by writing connection path information in a set of registers which has a bus-based routing configuration. Generally, building can include constructing, assembling, determining, establishing, deriving, saving, recording, or otherwise structuring the one or more SMP topologies. The one or more SMP topologies may include the arrangement of the various elements (e.g., connection paths, links, nodes) that make up the physical and logical structure of the multi-node server. In embodiments, building may include writing connection path information in a set of registers which has a bus-based routing configuration. The set of registers may include a portion of storage space in a processor chip configured for storage of addresses, instructions, or other data elements. For instance, the connection paths (e.g., communicative links) that exist between the nodes and processor chips of the multi-node server may be identified and saved (e.g., written) to each processor chip of the multi-node server. In certain embodiments, building may include recording the origination and destination addresses for a set of processor chips together with the bus identifiers configured to facilitate data communication between the respective processor chips (e.g., Bus ID X0 is configured to facilitate data communication between the start address of "0x1400 and the end address of 0x15FF, as illustrated in tables 910, 940, and 970 of FIG. 9). In certain embodiments, building may include assigning identifier bits to a set of cables configured to carry data between one or more processor chips (e.g., ID Bit 00 corresponds to the cable of A Bus 0). The identifier bits may be stored in a table written to the set of registers of each processor chip (e.g., as shown in tables 810 and 860 of FIG. 8). In this way, processor chips may consult the table to identify the identifier bit of the cable needed to facilitate communication with a particular destination processor chip. In certain embodiments, the table may be configured to be dynamically updated in the event of a change to the SMP topology. Other methods of building one or more SMP topologies are also possible.

At block 220, the first SMP topology may be identified (e.g., by the service processor firmware). The first SMP topology may indicate a first set of connection paths for a plurality of processor chips of the multi-node server. Generally, detecting, configuring, computing, sensing, recognizing, establishing, deriving, ascertaining, or otherwise determining the first SMP topology that indicates the first set of connection paths for the plurality of processor chips. The first SMP topology may include a representation of an initial arrangement of the nodes, processor chips, connections paths, and other elements of the multi-node server. The first SMP topology may include both the physical (e.g., hardware element placement, cable connections) and logical (e.g., how data traffic is conveyed between elements of the multi-node server) topology of the multi-node server. In embodiments, the first SMP topology may indicate a first set of connection paths for a plurality of processor chips. The first set of connection paths may include an initial or default configuration of the communicative links that exist between nodes and processor chips of the multi-node server (e.g., see FIG. 5). The first set of connection paths may be represented using physical topological elements (e.g., cables running between physical processing units) or logical topical elements (e.g., origination/destination addresses maintained in a table). For instance, the first set of connection paths may include a series of direct connections between nodes and processor chips. As an example, each processor chip may be connected to each other processor chip on the same node, as well as one or more processor chips on other nodes via direct cable connections (e.g., with no "hops" or indirect connections through other network elements). In embodiments, identifying the first SMP topology may include utilizing a topology diagnostic tool executed by the firmware of a service processor of one or more nodes or processor chips to analyze and record (e.g., map) the first SMP topology. In certain embodiments, the topology diagnostic tool may be executed by a hypervisor configured to manage the multi-node server. Other methods of identifying the first SMP topology are also possible.

Figure 6:
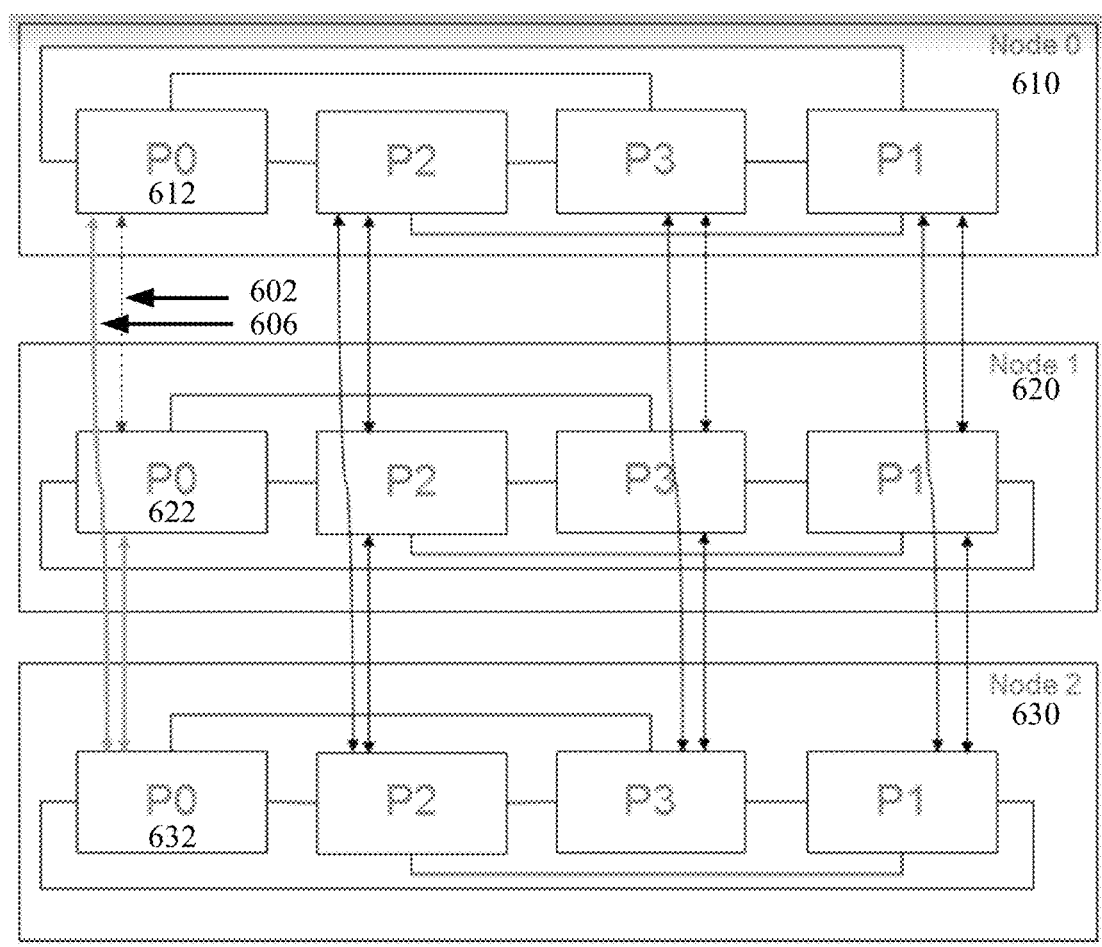
FIG. 6 illustrates an example system for symmetric multiprocessing management, according to embodiments.
Figure 7:
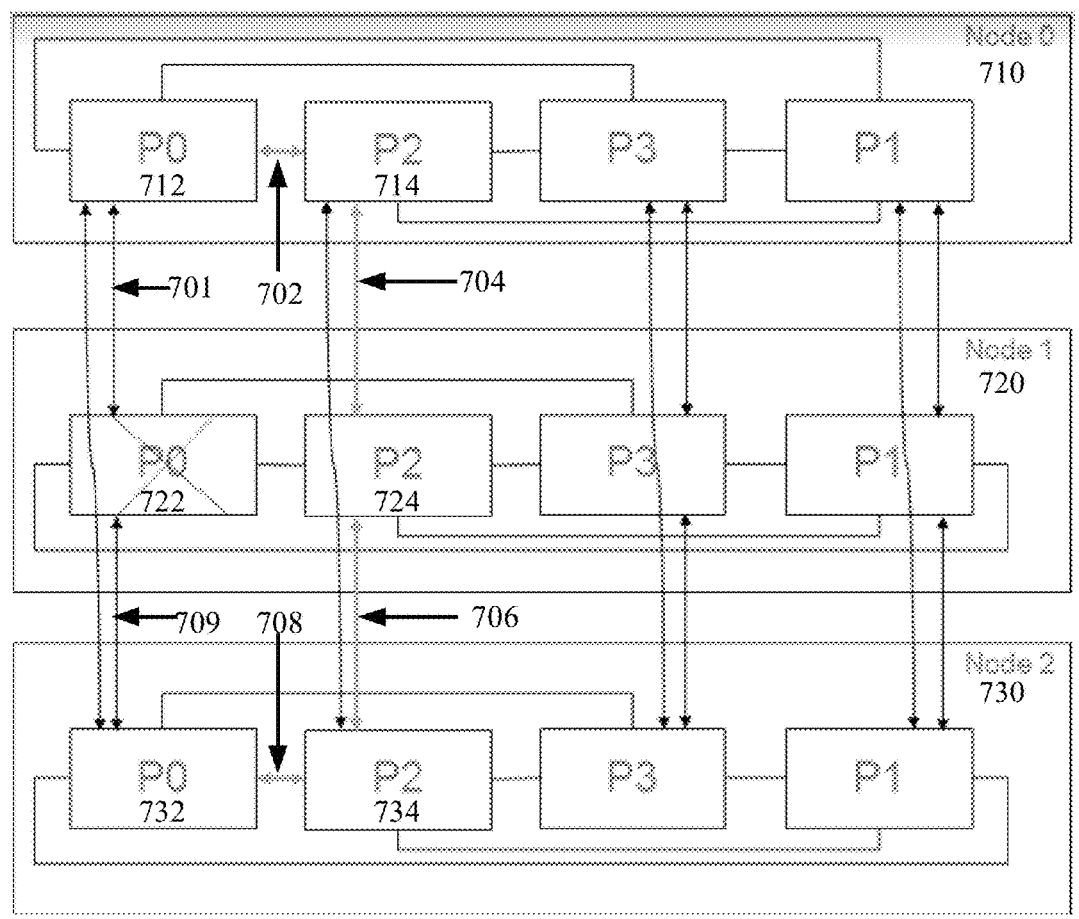
FIG. 7 illustrates an example system for symmetric multiprocessing management, according to embodiments.

At block 240, the second SMP topology may be identified (e.g., by the service processor firmware). The second SMP topology may indicate a second set of connection paths for the plurality of processor chips of the multi-node server. The second SMP topology may differ from the first SMP topology. Generally, identifying can include detecting, configuring, computing, sensing, extracting, establishing, deriving, ascertaining, or otherwise determining the second SMP topology that indicates the second set of connection paths for the plurality of processor chips. The second SMP topology may include a physical and/or logical representation of an alternate arrangement of the connections paths, nodes, processor chips, and other elements of the multi-node server that differs from the first SMP topology (e.g., at least one connection path, node, or processor chip is configured differently than the first SMP topology). In embodiments, the second SMP topology may indicate a second set of connection paths for the plurality of processor chips. For instance, the second set of connection paths may indicate a substitute, replacement, or alternate configuration of the communicative links that exist between nodes and processor chips of the multi-node server (e.g., see FIGS. 6-7). For instance, the second set of connection paths may include a series of indirect connections between nodes and processor chips. As an example, a first processor chip may be connected to a second processor chip (e.g., on the same node or on other nodes) via a third processor chip serving as an intermediary to route data traffic between the first and second processor chips (e.g., as shown in FIG. 7). In this way, the second set of connection paths may be used to circumvent or avoid malfunctioning connections (e.g., broken cables, processor chips operating irregularly). In embodiments, as described herein, identifying the second SMP topology may include utilizing a topology diagnostic tool executed by the firmware of a service processor (e.g., or a hypervisor) to formulate the second SMP topology. For instance, in embodiments, identifying may include simulating one or more potential error event situations (e.g., models of what may happen if particular cables or processors malfunction), and generating a set of second SMP topologies (e.g., alternate connection paths) to maintain data communication and high availability in the event of those error event situations. Other methods of identifying the second topology are also possible.

In embodiments, the second SMP topology may be configured such that each entire connection path of the second set of connection paths may differ from every entire connection path of the first set of connection paths indicated by the first SMP topology at block 245. Generally, configuring may include assembling, constructing, establishing, revising, modifying, formulating, deriving, or otherwise structuring the second SMP topology such that each entire connection path of the second set of connections paths may differ from every connection path of the first set of connection paths. Aspects of the disclosure, in certain embodiments, relate to generating a second SMP topology to provide complete redundancy for multi-node data communication in the case of an error event. Accordingly, aspects of the disclosure relate to constructing a second SMP topology in which every connection path of the second set of connections paths is different from every connection path of the first set of connection paths. In embodiments, configuring the second SMP topology may include formulating the second set of connection paths such that no individual connection path overlaps (e.g., is the same as, is identical to) any connection path of the first set of connection paths. As an example, in a situation where the first set of connection paths indicates a direct cable connection between a first processor chip and a second processor chip, the second set of connection paths may be configured to include an indirect connection path between the first and second processor chip using a third processor chip as an intermediary. Other methods of configuring the second SMP topology such that each entire connection path of the second set of connection paths differs from every entire connection path of the first set of connection paths are also possible.

Figure 5:
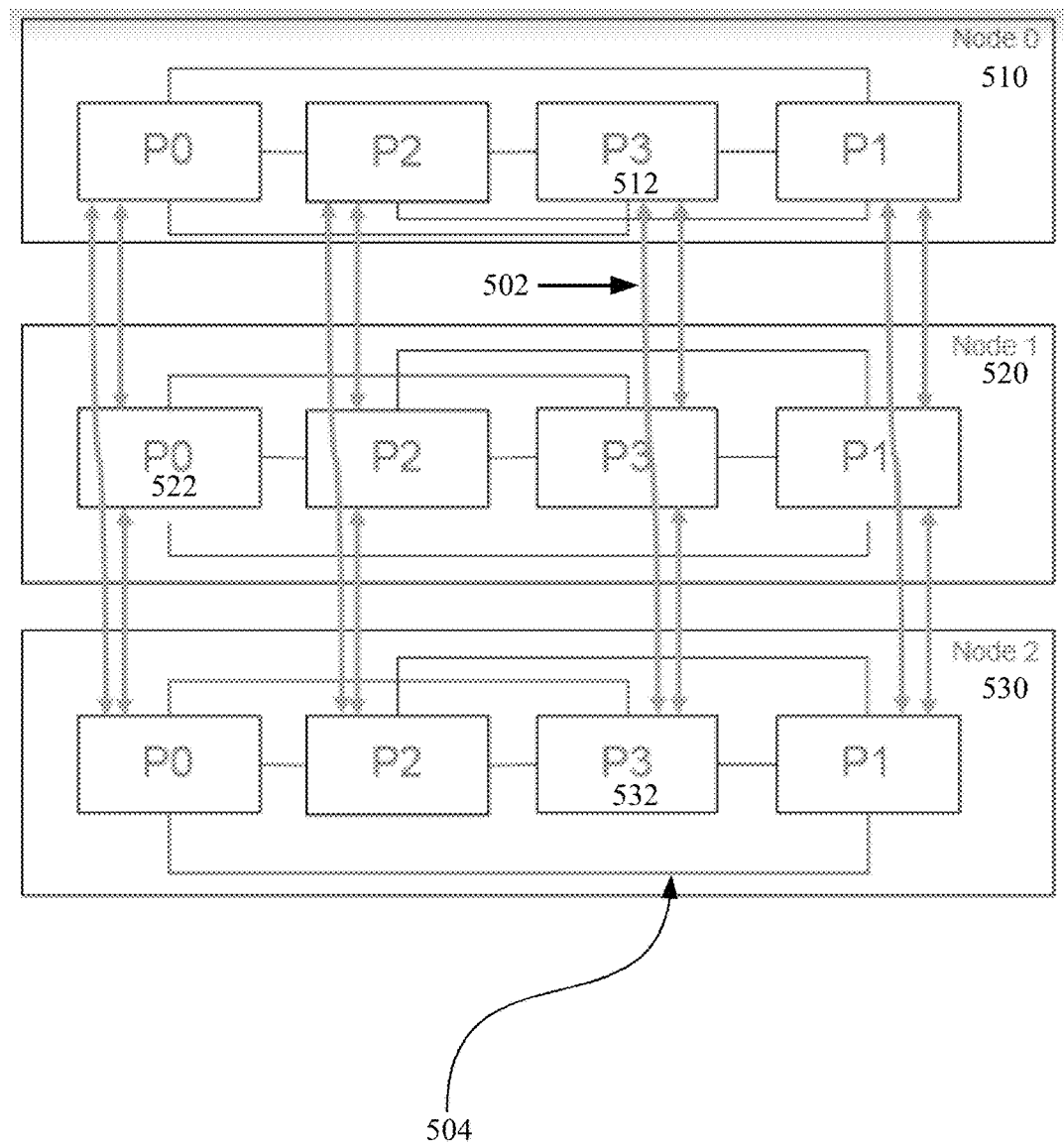
FIG. 5 illustrates an example system for symmetric multiprocessing management, according to embodiments.

In embodiments, a group of respective identifiers may be ascertained at block 251. The group of respective identifiers may be ascertained for a group of respective processor chips of a group of respective nodes of the multi-node server. Generally, ascertaining may include formulating, generating, labeling, identifying, assigning, computing, or otherwise determining the group of respective identifiers for the group of respective processor chips. In embodiments, the group of respective identifiers may include tags, markers, annotations, symbols, alphanumeric codes, or other representations or indications to identify a particular processor chip. In embodiments, ascertaining the group of respective identifiers may include assigning an indication of both the node that includes a particular processor chip (e.g., Node 0, or abbreviated as N0) together with an indication of the physical or logical position of the particular processor chip within the node (e.g., Processor 2, or abbreviated as P2). As an example, for a first node including four processor chips, a first processor chip may be assigned a respective identifier of N0P0, a second processor chip may be assigned a respective identifier of N0P1, a third processor chip may be assigned a respective identifier of N0P2, and a fourth processor chip may be assigned a respective identifier of N0P3 (e.g., as shown in FIGS. 5-7). As another example, for a second node in the same multi-node server having four processor chips, a first processor chip may be assigned a respective identifier of N1P0, a second processor chip may be assigned a respective identifier of N1P1, a third processor chip may be assigned a respective identifier of N1P2, and a fourth processor chip may be assigned a respective identifier of N1P3. In this way, each respective node of the multi-node server may be associated with a respective identifier indicating the physical or logical position of the particular node within the multi-node server. Other methods of ascertaining a group of respective identifiers for a group of respective processor chips are also possible.

In embodiments, a plurality of inter-node connection paths may be established to link like-identifiers using the group of respective identifiers at block 252. The plurality of inter-node connection paths may be established across the group of respective nodes of the multi-node server. Generally, establishing can include assembling, building, generating, instantiating, structuring, or otherwise creating the plurality of inter-node connection paths to link like-identifiers (e.g., respective identifiers that achieve a similarity threshold, share one or more attributes, corresponding physical/logical positions) using the group of respective identifiers. In embodiments, the inter-node connection paths may include communicative links (e.g., physical links such as cables or logical links such as origination/destination addresses) between processor chips located on different nodes within the multi-node server. As an example, the inter-node connection paths may include direct or indirect cable connections between a first processor chip on a first node and a first processor chip on a second node. In embodiments, establishing the plurality of inter-node connection paths may include utilizing an A-bus of the multi-node server to physically or logically link a processor chip with another processor chip that occupies a corresponding physical or logical position on a separate node (e.g., as illustrated by A-bus 502 of FIG. 5). As an example, a processor chip labeled N0P1 (e.g., the second processor chip on a first node) may be linked with a processor chip labeled N1P1 (e.g., the second processor chip on a second node), a processor chip labeled N2P1 (e.g., the second processor chip on a third node), or other processor chip occupying the same physical or logical position on another node of the multi-node server (e.g., via a direct connection or indirect connection through one or more other processor chips). Other methods of establishing the plurality of inter-node connection paths using the group of respective identifiers across the group of respective nodes of the multi-node server are also possible.

In embodiments, a plurality of intra-node connection paths may be established for the group of respective nodes of the multi-node server at block 253. Generally, establishing can include assembling, building, generating, instantiating, structuring, or otherwise creating the plurality of intra-node connection paths for the group of respective nodes of the multi-node server. In embodiments, the intra-node connection paths may include communicative links (e.g., physical links such as cables or logical links such as origination/destination addresses) between processor chips located on the same node of a multi-node server. As an example, the intra-node connection paths may include logical address associations (e.g., origination addresses linked with destination addresses) between a first processor chip on a first node and a second processor chip on the first node. In embodiments, establishing the plurality of intra-node connection paths may include using an X-bus of the multi-node server to physically or logically link a processor chip with another processor chip on the same node (e.g., as illustrated by X-bus 504 of FIG. 5). As an example, a processor chip labeled N2P2 (e.g., the third processor chip on a third node) may be linked with a processor chip labeled N2P1 (e.g., the second processor chip on the third node), a processor chip labeled N2P0 (e.g., the first processor chip on the third node), or other processor chip on the same node. In embodiments, as described herein, the intra-node connection paths may be established directly (e.g., single cable connection to carry data traffic directly between processor chips) or indirectly (e.g., via one or more other processor chips configured to route data traffic from the origination to the destination). Other methods of establishing the plurality of intra-node connection paths for the group of respective nodes of the multi-node server are also possible.

At block 260, an error event related to the first SMP topology may be detected. Generally, detecting can include sensing, discovering, recognizing, ascertaining, or otherwise determining the error event related to the first SMP topology. The error event may include a malfunction, failure, breakdown, bug, glitch, defect, or other irregularity with respect to the first SMP topology. For instance, the error event may indicate that a particular connection path (e.g., cable) between two processor chips has broken, such that data traffic cannot be routed between the two processor chips along the particular connection path. In embodiments, detecting may include ascertaining that a specific data request routing between two processor chips fails to complete. As an example, a first processor chip on a second node may attempt to transmit a set of data packets to a first processor chip on a third node using an inter-node connection path. In response to attempting to transmit the set of data packets, it may be sensed that the inter-node connection path between the first processor chip on the second node and the first processor chip on the third node has encountered an error event (e.g., a cable has broken such that it is no longer able to carry data). In certain embodiments, detecting may include utilizing an SMP topology diagnostic tool executed by a service processor of the multi-node server to verify (e.g., evaluate, examine, analyze) the functionality of the first set of connection paths of the first SMP topology and ascertain those connection paths associated with error events. Other methods of detecting the error event related to the first SMP topology are also possible.

In embodiments, a traffic flow error in the first set of connection paths may be detected at block 261. The detection of the traffic flow error may occur with respect to the error event related to the first SMP topology. Generally, detecting can include sensing, discovering, recognizing, ascertaining, or otherwise determining the traffic flow error in the first set of connection paths. The traffic flow error may include a failure or malfunction that impacts (e.g., prevents, limits, reduces, interrupts) the transmission of data traffic between two or more processor chips of the multi-node server. As examples, the traffic flow error may include a communication error between two or more processor chips, data packets not sending/arriving along a particular connection path, data corruption (e.g., packets arriving with defects or flaws), instructions/commands not executing properly, a processor chip not responding (e.g., to a request/instruction) or the like. In embodiments, detecting the traffic flow error may include initiating a test transmission (e.g., ping utility) to verify the reachability of a processor chip, and ascertaining that the processor chip is unreachable (e.g., no response received from the ping utility). In embodiments, detecting the traffic flow error may include examining one or more packets received by a particular processor chip, and determining that one or more packets is corrupted or otherwise damaged. Other methods of detecting the traffic flow error are also possible.

In embodiments, a cable error in the first set of connection paths may be detected at block 262. The detection of the cable error may occur with respect to the error event related to the first SMP topology. Generally, detecting can include sensing, discovering, recognizing, ascertaining, or otherwise determining the cable error in the first set of connection paths. The cable error may include a failure or malfunction that impacts (e.g., prevents, limits, reduces, interrupts) the functionality of a cable between two or more processor chips of the multi-node server. As examples, the cable error may include a physical cable failure (e.g., connector corrosion, short, wire breakage), a cable misconnection (e.g., cable connected to the wrong processor chip, wrong cable type), a bandwidth error (e.g., cable does not support the bandwidth needed by the processor chips, resulting in data loss), transmission incompatibilities (e.g., cable is not compatible with a transmission protocol used by one or more processor chips), or the like. In embodiments, detecting the cable error may include performing a cable diagnostic procedure to verify the functionality of the cable, and ascertaining that one or more cables is associated with impaired functionality. Other methods of detecting the cable error in the first set of connection paths are also possible.

In embodiments, a processor configuration error in the first set of connection paths may be detected at block 263. The detection of the processor configuration error may occur with respect to the error event related to the first SMP topology. Generally, detecting can include sensing, discovering, recognizing, ascertaining, or otherwise determining the processor configuration error in the first set of connection paths. The processor configuration error may include a failure or malfunction that impacts (e.g., prevents, limits, reduces, interrupts) the functionality of a processor chip of the multi-node server. As examples, the processor configuration error may include a processor chip that has not been configured to receive data traffic using one or more ports to which cables are connected, a processor chip that has a mis-configured security setting (e.g., firewall or other security configured too strictly to allow data traffic from other processor chips), a processor chip on which a particular software application or protocol has not been initialized (e.g., the processor chip is not prepared to handle/manage received data packets), or other setting or parameter of a processor chip that inhibits communication (e.g., data transmission) with other processor chips of the multi-node server. In embodiments, the processor configuration error may include a processor deconfiguration status, in which a particular processor chip has been taken down (e.g., for maintenance, reconfiguring, replacing) such that it is not available for communication with other processor chips. In embodiments, detecting the processor configuration error may include using a processor configuration diagnostic tool executed by the firmware of a service processor to examine the settings and parameters of one or more processor chips, and identifying that a particular processor chip is associated with the configuration error. Other methods of detecting the processor configuration error are also possible.

At block 280, a set of traffic may be routed using the second SMP topology. The routing of the set of traffic may occur by the service processor firmware in response to detecting the error event related to the first SMP topology. Generally, routing can include transmitting, conveying, relaying, directing, conducting, or otherwise sending the set of traffic using the second SMP topology. Aspects of the disclosure relate to the recognition that, in some situations, an error event with respect to the a connection path of the first SMP topology may result in limited communication or reduced availability of processor chips within the multi-node server. Accordingly, aspects of the disclosure relate to using the second SMP topology to facilitate communication of a set of data traffic between processor chips using a set of second (e.g., alternate) connection paths. The set of data traffic may include a volume of data transferred between two or more processor chips of the multi-node server. The set of data traffic may include instructions, requests, and other communication between processor chips. As an example, the set of data traffic may include a number of data packets that indicate a request for a destination processor chip to perform a database operation. In embodiments, routing may include analyzing the second set of connection paths indicated by the second SMP topology, and ascertaining an alternate connection path that may be used in place of a connection path associated with an error event in order to facilitate data communication between two or more processor chips. In response to ascertaining the alternate communication path, the set of data traffic may be transmitted to a destination processor chip using the alternate communication path indicated by the second SMP topology. Other methods of routing a set of data traffic in response to detecting an error event related to the first SMP topology are also possible.

In embodiments, the set of traffic may be switched from utilizing the first set of connection paths indicated by the first SMP topology to utilizing the second set of connection paths indicated by the second SMP topology at block 285. The switching of connection paths may occur in a dynamic fashion in response to detecting the error event related to the first SMP topology. Aspects of the disclosure relate to the recognition that, in certain embodiments, the first set of connection paths of the first SMP topology may be compromised (e.g., negatively impacted) by an error event. Accordingly, as described herein, aspects of the disclosure relate to utilizing a second SMP topology indicating a second (e.g., alternate) set of connection paths to maintain availability and communication between processor nodes in the case of an error event. Generally, switching can include swapping, exchanging, replacing, substituting, changing, or otherwise transitioning from the first set of connection paths to the second set of connection paths. In embodiments, switching may include utilizing a service processor to load the second SMP topology to a set of processor registers of the plurality of processor chips, and configuring the plurality of processor chips to automatically replace the first SMP topology with the second SMP topology in response to detecting the error event. As such, the set of traffic may be routed from an originating processor chip to a destination processor chip using the second set of connection paths (e.g., to avoid the connection path associated with an error event). In this way, the plurality of processor chips may utilize the alternate communication links indicated by the second set of connection paths to maintain data communication and availability in the case of an error event. Other methods of switching the set of traffic from utilizing the first set of connection paths to the second set of connection paths are also possible.

Method 200 concludes at block 299. Aspects of method 200 may provide performance or efficiency benefits. As described herein, aspects of method 200 relate to symmetric multiprocessing (SMP) management with respect to a multi-node server by service processor firmware of a hardware service processor. Aspects of method 200 may provide performance or efficiency benefits with respect to SMP management. As an example, in the case of an error event, a plurality of processor chips may be configured to dynamically transition from a first set of connection paths indicated by a first SMP topology to a second set of connection paths indicated by a second SMP topology in order to maintain data communication and availability between processor chips in the multi-node server environment. In certain embodiments, aspects of the disclosure may be implemented with respect to a single-node server (e.g., upon detection of an error detected with respect to a intra-node interface, processor chips may fall-back to a second SMP topology). Altogether, leveraging a set of alternate connection paths between a plurality of processor chips be associated with benefits including high availability, data communication reliability, and application performance.

Figure 3:
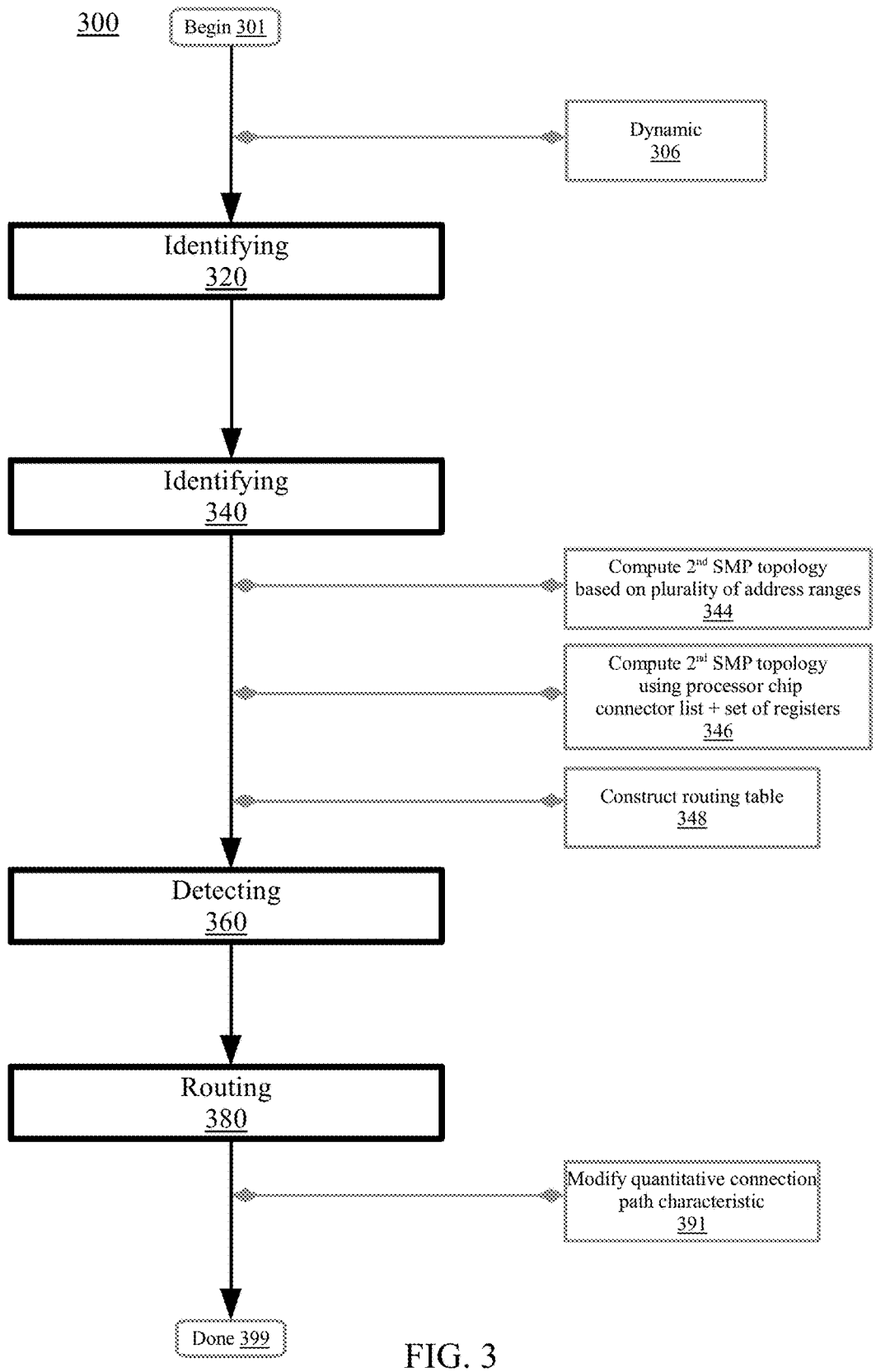
FIG. 3 is a flowchart illustrating a method for symmetric multiprocessing management, according to embodiments.

FIG. 3 is a flowchart illustrating a method 300 for symmetric multiprocessing management. Aspects of method 300 relate to computing a second SMP topology to maintain data communication and availability between a plurality of processor chips in the case of an error event. Aspects of method 300 may be similar or the same as aspects of method 200, and aspects may be utilized interchangeably with one or more methodologies described herein. At block 320, a first SMP topology which indicates a first set of connection paths for a plurality of processor chips of the multi-node server may be identified. At block 340, a second SMP topology which indicates a second set of connection paths for the plurality of processor chips may be identified. At block 360, an error event related to the first SMP topology may be detected. At block 380, a set of traffic may be routed using the second SMP topology in response to detecting the error event. The method 300 may begin at block 301.

In embodiments, the identifying of the first SMP topology, the identifying of the second SMP topology, the detecting of the error event, the routing of the set of traffic, and other steps described herein may each occur in a dynamic fashion to streamline SMP management at block 306. For instance, the identifying of the first SMP topology, the identifying the second SMP topology, the detecting of the error event, the routing of the set of traffic, and other steps described herein may occur in real-time, ongoing, or on-the-fly. As an example, one or more steps described herein may be performed on-the-fly (e.g., the plurality of processor chips may be configured to dynamically switch over from the first SMP topology to the second SMP topology in response to detecting of the error event) in order to streamline (e.g., facilitate, promote, enhance) data packet management. Other methods of performing the steps described herein are also possible.

At block 320, the first SMP topology may be identified by the service processor firmware. The first SMP topology may indicate a first set of connection paths for a plurality of processor chips of the multi-node server. At block 340, the second SMP topology may be identified by the service processor firmware. The second SMP topology may indicate a second set of connection paths for the plurality of processor chips of the multi-node server. The second SMP topology may differ from the first SMP topology.

In embodiments, based on a plurality of address ranges which map the plurality of processor chips of the multi-node server, the second SMP topology may be computed at block 344. The second SMP topology may indicate the second set of connection paths for the plurality of processor chips of the multi-node server. The computation may be carried-out by the service processor firmware. Generally, computing can include calculating, formulating, deriving, resolving, ascertaining, or otherwise determining the second SMP topology based on a plurality of address ranges which map the plurality of processor chips of the multi-node server. The plurality of address ranges may include names, tokens, alphanumeric codes, or other data strings that specify the logical location of a processor chip within the multi-node server environment. For instance, in certain embodiments, each processor chip of the plurality of processor chips may be associated with an address range expressed as a hexi-decimal value that allows it to be found by other processor chips within the multi-node server. As an example, a particular processor chip may be associated with an address of "0x1400" (e.g., as shown in table 910 of FIG. 9). In embodiments, computing the second SMP topology may include ascertaining a start address (e.g., origination location) for a first processor chip and an end address (e.g., destination location) for a second processor chip in order to define a communication link between the first and second processor chips. In embodiments, computing may include utilizing the service processor firmware to formulate a plurality of potential connection paths (e.g., direct and indirect paths) between each processor chip. In this way, in response to detecting an error event with respect to one or more connection paths, an alternate connection path to facilitate data transmission between processor chips may be identified. Other methods of computing the second SMP topology based on a plurality of address ranges are also possible.

In embodiments, using a processor chip connector list and a set of registers, the second SMP topology may be computed at block 346. The second SMP topology may indicate the second set of connection paths for the plurality of processor chips of the multi-node server. The computation may be carried-out by the service processor firmware. Generally, computing can include calculating, formulating, deriving, resolving, ascertaining, or otherwise determining the second SMP topology using the processor chip connector list and the set of registers. The processor chip connector list may include an index, table, series, directory, or other collection or listing of the plurality of processor chips (e.g., and associated node identifiers) in the multi-node server environment. In embodiments, the processor chip connector list may include a source list of the node identifiers for processor chips used for transmitting data, a destination list of the node identifiers for processor chips used for receiving data, and a destination list of the node identifiers for processor chips used as intermediaries to facilitate data flow between the source and destination processor chips. Processor chips may be simultaneously included in the source list, the destination list, and the connector list (e.g., depending on the role of the processor chip in different communication connections).

In embodiments, computing may include analyzing the physical SMP topology, and identifying a first set of processor chips that directly connect (e.g., single cable, no intermediaries) to each processor chip of the source list. The node identifiers of the first identified set of processor chips may be recorded in destination list entries for each respective processor chip of the source list. In embodiments, the physical SMP topology may be analyzed to identify a second set of processor chips that indirectly connect (e.g., multiple cables, one or more intermediaries) to each processor chip of the source list, and the node identifiers of the second identified set of processor chips may be recorded in destination list entries for each respective processor chip of the source list. In certain embodiments, the intermediary processor chips used to facilitate communication (e.g., "hops") between the source and destination processor chips may be recorded in connector list entries corresponding to the associated source and destination processor chips. In embodiments, the data of the source, destination, and connector lists may be encoded in a set of bits (e.g., two bits to indicate bus/hops needed to reach a specific chip/node) and saved to a set of processor registers used for bus routing (e.g., as shown in tables 810 and 860 of FIG. 8). In this way, the firmware of one or more service processors may access the set of processor registers to ascertain the second set of connection paths indicated by the second SMP topology (e.g., to maintain data communication in the case of an error event). Other methods of computing the second SMP topology using the processor chip connector list and the set of registers are also possible.

In embodiments, a routing table for the plurality of processor chips of the multi-node server may be constructed at block 348. The construction of the routing table may be performed by the service processor firmware using a set of registers having connection path information. Generally, constructing can include building, assembling, determining, establishing, deriving, saving, recording, or otherwise structuring the routing table for the plurality of processor chips of the multi-node server. The routing table may include a database table of columns and rows, an index, list, directory, or other form of structured data having a set of entries indicating the connection paths between the plurality of processor chips. In embodiments, constructing the routing table may include ascertaining (e.g., identifying, assigning) a first address (e.g., start address such as 0x1900) of a first processor chip and a second address (e.g., end address such as 0x1FFF) of a second processor chip, and recording the first and second address in association with each other to define a connection path between the first and second processor chips (e.g., as shown by tables 910, 940, and 970 of FIG. 9). The start and end addresses mentioned in 910, 940, and 970 depict the address range that can be accessed using the bus mentioned in the "Bus ID" column from a certain processor within which the table is programmed. As such, both the first and second addresses (e.g., start and end addresses) belong to the second processor to which the first processor is connected using the bus specified by the "Bus ID" column.

In embodiments, information related to one or more bus identifiers (e.g., hardware buses used for communication), the role of the connection path (e.g., primary or backup), the operational status of the connection path (e.g., functional or non-functional), and other information may be saved together with the first and second addresses in the routing table. In certain embodiments, constructing the routing table may include assembling an index of processor chip identifiers (e.g., N1P0) for a set of source processors (e.g., processor chips on which data transmissions origination) and corresponding destination processors (e.g., processor chips to which data traffic is directed/addressed) together with a set of bus identifiers that define the hardware bus used to carry data traffic between respective source and destination processors. Accordingly, the routing table may be accessed by the firmware of a service processor or hypervisor in order to ascertain connection paths between two or more processor chips. Other methods of constructing the routing table are also possible.

At block 360, an error event related to the first SMP topology may be detected. At block 380, a set of traffic using the second SMP topology may be routed. The routing of the set of traffic may occur by the service processor firmware in response to detecting the error event related to the first SMP topology.

In embodiments, a quantitative connection path characteristic may be modified at block 391. The modification of the quantitative connection path characteristic may be performed by service processor firmware with respect to routing the set of traffic. Generally, modifying can include altering, adjusting, adapting, revising, or otherwise changing the quantitative connection path characteristic. The quantitative connection path characteristic may include a measurement, representation, or expression of a physical or logical attribute of a particular connection path. In embodiments, the quantitative connection path characteristic may indicate the number of intermediate connections (e.g., hops) included in a particular connection path, the number of connection paths that incorporate an intermediate connection (e.g., rather than a direct connection), the total length of the connection (e.g., measured in terms of physical cable length, or logical distance between two processor chips), the time taken to transfer a data packet from a source to a destination using a particular connection path, or the like. In embodiments, modifying the quantitative connection path characteristic may include switching from the first set of connection paths indicated by the first SMP topology to the second set of connection paths indicated by the second set of SMP topology, such that the quantitative connection path characteristic of one or more connection paths changes (e.g., between the first and second set of connection paths). As an example, transitioning from the first set of connection paths to the second set of connection paths may change a quantitative connection path characteristic of intermediate connection count from 0 (e.g., a direct connection) to 2 (e.g., 2 intermediary processor chips used as hops). Other methods of modifying the quantitative connection path characteristic are also possible. Method 300 concludes at block 399. Aspects of method 300 may provide performance or efficiency benefits associated with high availability, data communication reliability, and application performance.

Figure 4:
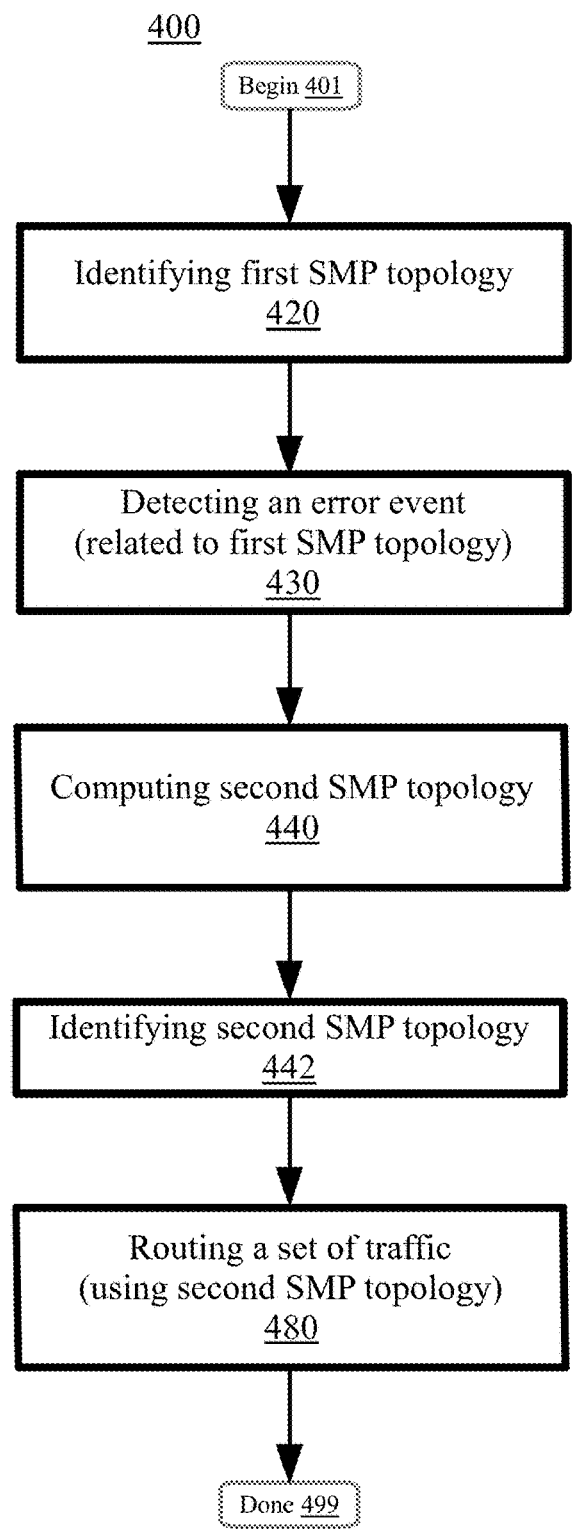
FIG. 4 is a flowchart illustrating a method for symmetric multiprocessing management, according to embodiments.

FIG. 4 is a flowchart illustrating a method 400 for symmetric multiprocessing management, according to embodiments. Aspects of method 400 relate to dynamic computation of a second SMP topology in response to detecting an error event related to a first SMP topology. Aspects of method 400 may be similar or the same as aspects of method 200/300, and aspects may be utilized interchangeably with one or more methodologies described herein. The method 400 may begin at block 401. At block 420, the first SMP topology may be identified by the service processor firmware. The first SMP topology may indicate a first set of connection paths for a plurality of processor chips of the multi-node server. At block 430, an error event related to the first SMP topology may be detected.

In embodiments, the second SMP topology may be computed in a dynamic fashion by the service processor firmware in response to detecting an error event related to the first SMP topology at block 440. The second SMP topology may indicate the second set of connection paths for the plurality of processor chips of the multi-node server. Generally, calculating, formulating, deriving, resolving, ascertaining, or otherwise determining the second SMP topology in a dynamic fashion in response to detecting the error event related to the first SMP topology. Aspects of the disclosure relate to the recognition that, in some situations, information regarding the nature of the error event may be used to determine a second SMP topology configured to maintain availability and communication between processor chips of the multi-node server. Accordingly, in embodiments, aspects of the disclosure relate to dynamically computing the second SMP topology in response to detecting an error event related to the first SMP topology. In embodiments, computing may include collecting a set of error event information pertaining to which connection paths were affected, the severity, expected duration, potential causes/triggers, solutions, and the like. The service processor firmware may be configured to use the set of collected error event information to formulate a second SMP topology to maintain data communication between the processor chips affected by the error event (e.g., using a set of second connection pathways). For instance, the second SMP topology may enable data communication between the processor chips by indicating an alternate connection pathway to be used in place of the connection pathway affected by the error event. In embodiments, in the event that the alternate connection pathway of the second SMP topology is also affected by an error event, or a specific data request routing fails, the hypervisor may be configured to submit a resolution request to the service processor to dynamically recompute a connection path between two or more service processors (e.g., to re-attempt the data request routing). Other methods of computing the second SMP topology dynamically in response to detecting an error event are also possible.

At block 442, the second SMP topology may be identified by the service processor firmware. The second SMP topology may indicate a second set of connection paths for the plurality of processor chips of the multi-node server. The second SMP topology may differ from the first SMP topology. At block 480, the set of traffic may be routed using the second SMP topology. The routing of the set of traffic using the second SMP topology may be performed by the service processor firmware in response to detecting the error event related to the first SMP topology. Method 400 concludes at block 499. Aspects of method 400 may provide performance or efficiency benefits associated with high availability, data communication reliability, and application performance.

FIG. 5 illustrates an example system for symmetric multiprocessing management, according to embodiments. Aspects of FIG. 5 relate to an example multi-node server environment 500 which may be used to implement one or more aspects of symmetric multi-processing management. In embodiments, as described herein, the multi-node server environment 500 may include a computing device configured to provide functionality for other programs or devices (e.g., clients). For example, the multi-node server environment 500 may be configured to provide various services such as data/resource sharing functionality, computation operations, data storage/streaming functionality, or the like to one or more clients. In embodiments, the multi-node server environment 500 may include a set of nodes. The set of nodes may include a set, group, cluster, or other physical or logical collection of a plurality of processor chips. For instance, as shown in FIG. 5, the multi-node server environment 500 may include a Node 0 510, a Node 1 520, and a Node 2 530.

In embodiments, one or more nodes of the multi-node server environment 500 may include a set of processor chips. The plurality of processor chips may include integrated circuits or other electronic circuitry elements configured to carry out the instructions of computer programs (e.g., applications hosted by the multi-node server environment 500). As shown in FIG, Node 0 510 may include a number of processor chips such as processor chip 512, Node 1 520 may include a number of processor chips such as processor chip 522, and Node 2 530 may include a number of processor chips such as processor chip 532. In embodiments, one or more processor chips may be associated with a respective identifier to indicate the physical or logical position of the processor chip with respective to other elements of the multi-node server environment 500. The respective identifier may indicate both the node that includes a particular processor chip together with an indication of the physical or logical position of the particular processor chip within the node. As an example, processor chip 512 may be associated with a respective identifier of "N0P3," processor chip 522 may be associated with a respective identifier of "N1P0," and processor chip 532 may be associated with a respective identifier of "N2P3."

In embodiments, the plurality of processor chips may be communicatively connected to other processor chips of the multi-node server environment 500. For instance, the plurality of processor chips may be communicatively connected to other processor chips located on the same node (e.g., intra-node node connections) as well as processor chips located on other nodes (e.g., inter-node connections) of the multi-node server. As an example, as shown in FIG. 5, the multi-node server environment 500 may include a set of A-buses (e.g., depicted as the vertical arrows running between processor chips of different nodes) such as A-bus 502 to facilitate data communication between processor chips located on different nodes. For instance, A-bus 502 may be configured to connect processor chip 512 (e.g., N0P3) of Node 0 510 with processor chip 532 (e.g., N2P3) of Node 2 530. In embodiments, the multi-node server environment 500 may include a set of X-buses (e.g., depicted as the horizontal lines running between processor chips on the same node) such as X-bus 504 to facilitate data communication between processor chips located on the same nodes. Other types of multi-node server environment 500 are also possible.

FIG. 6 illustrates an example system for symmetric multiprocessing management, according to embodiments. Aspects of FIG. 6 relate to an example multi-node server environment 600 in which an alternate connection path may be used to maintain data traffic between processor chips in the case of an error event with respect to a particular connection path. As described herein, aspects of the disclosure relate to the recognition that, in some situations, an error event (e.g., faulty cable, bus error) may occur with respect to a particular connection path. For instance, as shown in FIG. 6, an error event may be detected (e.g., by a service processor of the multi-node server environment 600) with respect to a connection path associated with an A-bus 602 configured to carry data traffic between processor chip 612 of Node 610 and processor chip 622 of Node 620. Accordingly, as described herein, aspects of the disclosure relate to using an alternate connection path (e.g., second set of connections indicated by a second SMP topology) to reroute A-bus 602 data traffic between the processor chip 612 and the processor chip 622. For instance, in embodiments, a service processor for the multi-node server environment 600 may be configured to reroute data traffic from A-bus 602 to A-bus 606. In this way, A-bus 606 may be configured to carry data traffic between processor chip 612 of Node 610 and processor chip 632 of Node 630, and then to processor chip 622 of Node 620—thereby avoiding the malfunctioning connection path of A-bus 602. Accordingly, the alternate connection path may facilitate high availability and data communication between processor chips of the multi-node server environment 600.

FIG. 7 illustrates an example system for symmetric multiprocessing management, according to embodiments. Aspects of FIG. 7 relate to an example multi-node server environment 700 in which an alternate connection path may be used to maintain data traffic between processor chips in the case of an error event with respect to a particular processor chip. As described herein, aspects of the disclosure relate to the recognition that, in some situations, an error event (e.g., processor chip failure, unavailability, configuration error) may occur with respect to a particular processor chip. For instance, as shown in FIG. 7, an error event may be detected (e.g., by a service processor of the multi-node server environment 700) with respect to a processor chip 722 of Node 1 720, such that data traffic between processor chip 712 of Node 0 710 and processor chip 724 of Node 1 720, as well as data traffic between processor chip 732 of Node 2 730 and processor chip 724 may be interrupted. Accordingly, as described herein, aspects of the disclosure relate to using an alternate connection path (e.g., second set of connections indicated by a second SMP topology) to reroute data traffic using a combination of A-buses and X-buses to maintain data communication between processor chips. For example, in embodiments, A-bus 701 data traffic may be routed via X-bus 702 and A-bus 704 to facilitate communication between processor chip 712 and processor chip 724 via processor chip 714. Similarly, A-bus 709 data traffic may be routed via X-bus 708 and A-bus 706 to facilitate communication between processor chip 732 and processor chip 724 via processor chip 734. In this way, data traffic communication may be maintained between processor chip 724 and processor chips 712, 732, respectively. Other methods of using alternate connection paths to maintain data communication between processor chips are also possible.

FIG. 8 illustrates an example system for symmetric multiprocessing management, according to embodiments. Aspects of FIG. 8 relate to a set of connector lists 800 that may be used to indicate a set of connection paths for the plurality of processor chips of the multi-node server. Generally, the set of connector lists 800 may include an index, table, series, directory, or other collection or listing of connection pathways between the plurality of processor chips of the multi-node server. In embodiments, the set of connector lists 800 may include a first connector list 810. The first connector list 810 may correspond to a first SMP topology, and indicate a first (e.g., original, default, standard, direct) set of connection pathways between one or more processor chips. In embodiments, the first connector list 810 may include a set of source processor chips listed by respective identifier (e.g., shown in the leftmost column of the first connector list 810) and a set of destination processor chips listed by respective identifier (e.g., shown in the top row of the first connector list 810). In embodiments, the first connector list 810 may include a set of bus identifiers that indicate which hardware bus may be used to transmit data traffic from a particular source processor chip to a particular destination processor chip. For instance, a bus identifier of "00" may indicate a hardware bus of "A-bus 0," a bus identifier of "01" may indicate a hardware bus of "A-bus 1," and a bus identifier of "10" may indicate a hardware bus of "A-bus 2" (e.g., and a bus identifier of "X" may indicate an invalid connection). As an example, for a source processor chip of "N0P0" and a destination processor chip of "N1P0," the first connector list 810 may indicate a connection path that makes use of a hardware bus associated with a bus identifier of "00" (e.g., A-bus 0). Other methods of utilizing the first connector list 810 are also possible.

In embodiments, the set of connector lists 800 may include a second connector list 860. The second connector list 860 may correspond to a second SMP topology, and indicate a second (e.g., alternate, replacement, substitute, back-up) set of connection pathways between one or more processor chips. In embodiments, the second connector list 860 may be generated in response to an error event detected with respect to a particular connection path of the first connector list 810. For instance, in embodiments, an error event may occur with respect to a connection path between a source processor chip of "N0P0" and a destination processor chip of "N1P0." Accordingly, the second connector list 860 may be generated to indicate one or more alternate connection pathways to maintain communication between the source processor chip of "N0P0" and the destination processor chip of "N1P0." As an example, in embodiments, the second connector list may indicate an alternate bus identifier of "01" (e.g., corresponding to a hardware bus of "A-bus 1") to carry data traffic between the source processor chip of "N0P0" and the destination processor chip of "N1P0." In this way, the connection path associated with the error event may be avoided, and data communication between the source processor chip "N0P0" and the destination processor chip "N1P0" may be maintained. Other methods of utilizing the second connector list 860 are also possible.

FIG. 9 illustrates an example system for symmetric multiprocessing management, according to embodiments. Aspects of FIG. 9 relate to a set of routing tables 900 configured to indicate a set of connection paths for the plurality of processor chips of the multi-node server. The set of routing tables 900 may include a first routing table 910, a second routing table 940, and a third routing table 970. Generally, the routing table may include a database table of columns and rows, an index, list, directory, or other form of structured data having a set of entries indicating the connection paths between the plurality of processor chips. As described herein, the set of routing tables 900 may maintain information including start addresses and end addresses to define connection paths for a set of processor chips, bus identifier data (e.g., hardware buses used for communication), the role of particular connection paths (e.g., primary or backup), the operational status of particular connection paths (e.g., functional or non-functional), and the like. In embodiments, a routing table may be constructed and maintained in a set of processor registers for each processor chip that indicates the connection paths between that processor chip and the other processor chips of the multi-node environment. For instance, the first routing table 910 may be saved in a first processor chip (e.g., N0P0 of FIG. 5) and the second routing table 940 may be saved in a second processor chip (e.g., N1P0 of FIG. 5) to indicate the connection paths between the first processor chip, the second processor chip, and the other processor chips of the multi-node server, respectively.

Aspects of the disclosure, as described herein, relate to generating a second SMP topology to indicate a second (e.g., alternate) set of connection paths between processor chips to maintain data communication in case of an error event. As an example, with reference to FIG. 6, consider a situation in which the A-bus 602 (e.g., Bus ID A0) fails, or the processor chip N1P0 (e.g., processor chip 622) becomes unavailable. Accordingly, as described herein, it may be desirable to formulate a set of alternate connection paths to facilitate data communication between N0P0, N1P1, N1P2, and N1P3. As such, a third routing table 970 may be generated to indicate a set of potential alternate connection paths. For instance, in response to identifying an error event with respect to the Bus ID A0 (e.g., impacting data communication between start address 0x2000 and end address 0x2FFF), the third routing table 970 may indicate that an alternate hardware bus associated with a Bus ID of X0 may be used to maintain data communication between the same address range. Accordingly, the service processor may be configured to use the backup connection path indicated by the third routing table 970 to carry data between the start address of 0x2000 and the end address 0x2FFF. Other methods of using the set of routing tables 900 for SMP management are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of symmetric multi-processing (SMP) management with respect to a multi-node server by service processor firmware of a hardware service processor, the method comprising:
    identifying, by the service processor firmware, a first SMP topology which indicates a first set of connection paths for a plurality of processor chips of the multi-node server;
    identifying, by the service processor firmware, a second SMP topology which indicates a second set of connection paths for the plurality of processor chips of the multi-node server, wherein the second SMP topology differs from the first SMP topology;
    detecting an error event related to the first SMP topology;
    routing, by the service processor firmware in response to detecting the error event related to the first SMP topology, a set of traffic using the second SMP topology,
        wherein the identifying the first SMP topology, the identifying the second SMP topology, the detecting, and the routing each occur in an automated fashion without user intervention; and
    detecting, with respect to the error event relate to the first SMP topology, a traffic flow error in the first set of connection paths.

2. The method of claim 1, further comprising:
    initiating an initial program load (IPL); and
    validating, by the service processor firmware, a potential for one or more SMP topologies.

3. The method of claim 1, further comprising:
    building, by writing connection path information in a set of registers which has a bus-based routing configuration, one or more SMP topologies.

4. The method of claim 1, further comprising:
    ascertaining, for a group of respective processor chips of a group of respective nodes of the multi-node server, a group of respective identifiers;
    establishing, to link like-identifiers using the group of respective identifiers, a plurality of inter-node connection paths across the group of respective nodes of the multi-node server; and
    establishing a plurality of intra-node connection paths for the group of respective nodes of the multi-node server.

5. The method of claim 1, further comprising:
    configuring the second SMP topology such that each entire connection path of the second set of connection paths has a difference from every entire connection path of the first set of connection paths indicated by the first SMP topology.

6. The method of claim 1, further comprising:
    switching, in a dynamic fashion in response to detecting the error event related to the first SMP topology, the set of traffic from utilizing the first set of connection paths indicated by the first SMP topology to utilizing the second set of connection paths indicated by the second SMP topology.

7. The method of claim 1, further comprising:
    detecting, with respect to the error event related to the first SMP topology, a cable error in the first set of connection paths.

8. The method of claim 1, further comprising:
    detecting, with respect to the error event related to the first SMP topology, a processor configuration error in the first set of connection paths.

9. The method of claim 1, further comprising:
    modifying, by service processor firmware with respect to routing of the set of traffic, a quantitative connection path characteristic.

10. The method of claim 1, further comprising:
    computing, in a dynamic fashion by the service processor firmware in response to detecting the error event related to the first SMP topology, the second SMP topology which indicates the second set of connection paths for the plurality of processor chips of the multi-node server.

11. The method of claim 1, further comprising:
    computing, by the service processor firmware based on a plurality of address ranges which map to the plurality of processor chips of the multi-node server, the second SMP topology which indicates the second set of connection paths for the plurality of processor chips of the multi-node server.

12. The method of claim 1, further comprising:
    computing, by the service processor firmware using a processor chip connector list and a set of registers, the second SMP topology which indicates the second set of connection paths for the plurality of processor chips of the multi-node server.

13. The method of claim 1, further comprising:
    constructing, by the service processor firmware using a set of registers having connection path information, a routing table for the plurality of processor chips of the multi-node server.

14. The method of claim 1, wherein the operational steps each occur in a dynamic fashion to streamline symmetric multiprocessing management.

15. The method of claim 1, further comprising:
    initiating an initial program load (IPL);
    validating, by the service processor firmware, a potential for one or more SMP topologies;

building, by writing connection path information in a set of registers which has a bus-based routing configuration, one or more SMP topologies;

ascertaining, for a group of respective processor chips of a group of respective nodes of the multi-node server, a group of respective identifiers;

establishing, to link like-identifiers using the group of respective identifiers, a plurality of inter-node connection paths across the group of respective nodes of the multi-node server;

establishing a plurality of intra-node connection paths for the group of respective nodes of the multi-node server;

configuring the second SMP topology such that each entire connection path of the second set of connection paths has a difference from every entire connection path of the first set of connection paths indicated by the first SMP topology;

detecting, with respect to the error event related to the first SMP topology, a traffic flow error in the first set of connection paths; and switching, in a dynamic fashion in response to detecting the error event related to the first SMP topology, the set of traffic from utilizing the first set of connection paths indicated by the first SMP topology to utilizing the second set of connection paths indicated by the second SMP topology.

16. A system of symmetric multiprocessing (SMP) management with respect to a multi-node server by service processor firmware of a hardware service processor, the system comprising:

a memory having a set of computer readable computer instructions, and a processor for executing the set of computer readable instructions, the set of computer readable instructions including:

identifying, by the service processor firmware, a first SMP topology which indicates a first set of connection paths for a plurality of processor chips of the multi-node server;

identifying, by the service processor firmware, a second SMP topology which indicates a second set of connection paths for the plurality of processor chips of the multi-node server, wherein the second SMP topology differs from the first SMP topology;

detecting an error event related to the first SMP topology;

routing, by the service processor firmware in response to detecting the error event related to the first SMP topology, a set of traffic using the second SMP topology, wherein the identifying the first SMP topology, the identifying the second SMP topology, the detecting, and the routing each occur in an automated fashion without user intervention; and detecting, with respect to the error event related to the first SMP topology, a traffic flow error in the first set of connection paths.

17. A computer program product of symmetric multiprocessing (SMP) management with respect to a multi-node server by service processor firmware of a hardware service processor, the computer program product comprising a computer readable storage medium having program instructions embodied therewith, wherein the computer readable storage medium is not a transitory signal per se, the program instructions executable by a processor to cause the processor to perform a method comprising:

identifying, by the service processor firmware, a first SMP topology which indicates a first set of connection paths for a plurality of processor chips of the multi-node server;

identifying, by the service processor firmware, a second SMP topology which indicates a second set of connection paths for the plurality of processor chips of the multi-node server, wherein the second SMP topology differs from the first SMP topology;

detecting an error event related to the first SMP topology;

routing, by the service processor firmware in response to detecting the error event related to the first SMP topology, a set of traffic using the second SMP topology, wherein the identifying the first SMP topology, the identifying the second SMP topology, the detecting, and the routing each occur in an automated fashion without user intervention; and detecting, with respect to the error event related to the first SMP topology, a traffic flow error in the first set of connection paths.

18. The computer program product of claim 17, wherein the program instructions are stored in the computer readable storage medium in a data processing system, and wherein the program instructions were downloaded over a network from a remote data processing system.

19. The computer program product of claim 17, wherein the program instructions are stored in the computer readable storage medium in a server data processing system, and wherein the program instructions are downloaded over a network to the remote data processing system for use in a second computer readable storage medium with the remote data processing system.

* * * * *